(12) United States Patent
Stohr et al.

(10) Patent No.: US 7,626,028 B2
(45) Date of Patent: Dec. 1, 2009

(54) USE OF QUINALDINE AND NAPHTHALINE DERIVATIVES AS CRYSTALLISATION MODIFIERS

(75) Inventors: Andreas Stohr, Freinsheim (DE); Manfred Schroeck, Birkenheide (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 608 days.

(21) Appl. No.: 10/560,039

(22) PCT Filed: Jun. 8, 2004

(86) PCT No.: PCT/EP2004/006164

§ 371 (c)(1), (2), (4) Date: Dec. 8, 2005

(87) PCT Pub. No.: WO2004/108837

PCT Pub. Date: Dec. 16, 2004

(65) Prior Publication Data

US 2006/0150866 A1   Jul. 13, 2006

(30) Foreign Application Priority Data

Jun. 11, 2003 (DE) ................. 103 26 631

(51) Int. Cl.
*C07D 215/38* (2006.01)
(52) U.S. Cl. .................. 546/156; 546/159; 546/167
(58) Field of Classification Search ................. 546/153, 546/156, 159, 167
See application file for complete search history.

(56) References Cited

FOREIGN PATENT DOCUMENTS

| DE | 17 70 960 | 1/1972 |
| DE | 26 26 271 | 12/1976 |
| DE | 26 38 528 | 3/1977 |
| DE | 27 06 872 | 8/1977 |
| DE | 2924066 | * 12/1980 |
| EP | 1 138 723 | 10/2001 |
| JP | 51147544 | * 12/1976 |
| JP | 2001335711 | * 12/2001 |
| WO | 02/00643 | 1/2002 |

OTHER PUBLICATIONS

Pagani, CA 85:42101, abstract only of Farmaco, Edizione Scientifica, vol. 31(5), pp. 364-371, 1976.*

* cited by examiner

*Primary Examiner*—D. Margaret Seaman
(74) *Attorney, Agent, or Firm*—Oblon, Spivak, McClelland, Maier & Neustadt, L.L.P.

(57) ABSTRACT

The invention relates to the use of compounds of general formula (I) as crystallization modifiers for organic pigments, in which formula the variables have the following designation: A represents =N— or =CH—; X represents methyl or a radical of formula (IIa) if A represents =N—, and a radical R if A represents =CH—; Y represents a radical R or a radical of formula (IIb), either X representing a radical of formula (IIa) or Y representing a radical of formula (IIb); and the rings $B^1$ and $B^2$ can be independently substituted, in addition, by at least one of the radicals R which are the same or different and do not represent hydrogen.

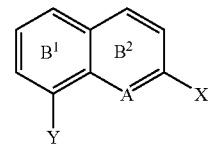

I

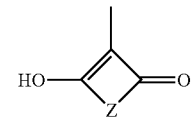

IIa

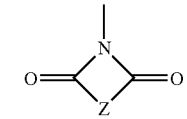

IIb

23 Claims, No Drawings

USE OF QUINALDINE AND NAPHTHALINE DERIVATIVES AS CRYSTALLISATION MODIFIERS

The present invention relates to the use of of compounds of the general formula I

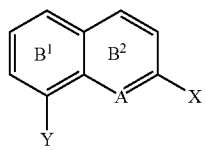

where
A is =N— or =CH—;
X when A is =N— is methyl or a radical of the formula IIa

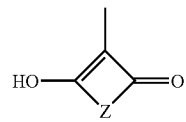

or when A is =CH— is an R radical;
Y is an R radical or a radical of the formula IIb

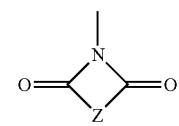

with either X being a radical of the formula IIa or Y being a radical of the formula IIb;
R is hydrogen, halogen, $C_1$-$C_4$-alkyl, —$SO_3H$, —$SO_3^-Me^+$, —$SO_3^-N^+R^1R^2R^3R^4$, —$SO_2NR^1R^2$, —$CH_2NR^1R^2$, —$CH_2R^5$, —COOH, —$COO^-Me^+$, —$COO^-N^+R^1R^2R^3R^4$, —$COOR^6$;
or —$COR^6$;
$R^1$, $R^2$, $R^3$ and $R^4$ are each independently hydrogen; $C_1$-$C_{22}$-alkyl or $C_2$-$C_{22}$-alkenyl whose carbon chain may in either case be interrupted by one or more —O—, —S—, —$NR^7$—, —CO— or —$SO_2$— moieties and/or which may be substituted by one or more of hydroxyl, halogen, aryl, $C_1$-$C_4$-alkoxy and acetyl; $C_3$-$C_8$-cycloalkyl whose carbon skeleton may be interrupted by one or more —O—, —S—, —$NR^7$— or —CO— moieties and/or which may be substituted by one or more of hydroxyl, halogen, aryl, $C_1$-$C_4$-alkoxy and acetyl; hydroabietyl, abietyl or aryl; $R^1$ and $R^2$ or $R^1$, $R^2$ and $R^3$ may combine to form a 5- to 7-membered cyclic radical which contains the nitrogen atom and may contain further hetero atoms;
$R^5$ is a radical of the formula IIb'

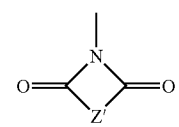

$R^6$ is one of the $R^1$ alkyl radicals;
$R^7$ is hydrogen or $C_1$-$C_4$-alkyl;

Me is an alkali metal ion;
Z and Z' are each independently arylene which may be substituted by one or more of halogen, —$SO_3H$, —$SO_3^-Me^+$, —$SO_3^-N^+R^1R^2R^3R^4$, and $C_1$-$C_{12}$-alkyl, and
the rings $B^1$ and $B^2$ may each be independently additionally substituted by one or more identical or different R radicals other than hydrogen,
as crystallization modifiers for organic pigments.

The present invention further relates to a process for converting crude organic pigments into a finely divided pigmentary form.

The present invention also relates to pigment preparations comprising (A) at least one organic pigment and (B) at least one of the compounds of the formula 1, and also novel compounds of the formula I'.

Organic pigments are known for their brilliance and clean hue and so are of particular interest for a multiplicity of applications where, however, their other properties have to meet tougher and tougher requirements. For instance, a fine state of subdivision and a narrow particle size distribution are a prerequisite for pigments to be used in ink jet inks, color filters and electrophotographic toners.

Quinophthalone pigments in particular are interesting pigments for the yellow part of the spectrum because of their stability, especially their high light and weather fastness and also heat resistance. C.I. Pigment Yellow 138 may be mentioned as a particularly important representative of this class of pigment (DE-A-17 70 960). Further quinophthalone pigments are described in DE-A-26 26 271, 26 38 528 and 27 06 872. As-synthesized quinophthalone pigments have coarse crystals and a very heterogeneous particle size distribution. To convert them into a useful pigmentary state, these pigments are therefore typically subjected to a finishing operation involving grinding with or without recrystallization.

WO-A-02/00643 discloses finishing pigments in the presence of specifically modified quinophthalone derivatives, i.e., reaction products of the pigments themselves. However, these crystallization modifiers have to be synthesized in an additional reaction step subsequent to synthesis of the pigments.

It is an object of the present invention to remedy this disadvantage and provide, in an advantageous, economical manner, substances capable of exerting an advantageous influence on the crystallization of organic pigments.

We have found that this object is achieved by the use of the compounds of the above-defined formula I as crystallization modifiers for organic pigments.

Preferred compounds correspond to the quinaldine and aminoquinaldine derivatives of the formula Ia and the aminonaphthalene derivatives of the formula Ib, which are each discernible from subsidiary claims.

The present invention also provides a process for converting crude organic pigments into a finely divided pigmentary form, which comprises finishing of the crude pigment in the presence of one or more of the compounds of the formula I.

The present invention further provides pigment preparations comprising (A) at least one organic pigment and (B) at least one compound of the formula I.

The present invention finally provides the compounds of the formula I'

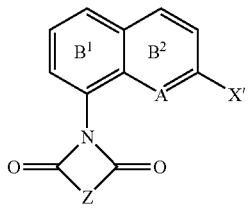

where
A is =N— or =CH—;
X' when A is =N— is methyl and when A is =CH— is an R radical;
R is hydrogen, halogen, $C_1$-$C_4$-Alkyl, —$SO_3H$, —$SO_3^-Me^+$, —$SO_3^-N^+R^1R^2R^3R^4$, —$SO_2NR^1R^2$, —$CH_2NR^1R^2$, —$CH_2R^5$, —COOH, —$COO^-N^+R^1R^2R^3R^4$, —$COOR^6$ or —$COR^6$;
$R^1$, $R^2$, $R^3$ and $R^4$ are each independently hydrogen; $C_1$-$C_{22}$-alkyl or $C_2$-$C_{22}$-alkenyl whose carbon chain may in either case be interrupted by one or more —O—, —S—, —$NR^7$—, —CO— or —$SO_2$— moieties and/or which may be substituted by one or more of hydroxyl, halogen, aryl, $C_1$-$C_4$-alkoxy and acetyl; $C_3$-$C_8$-cycloalkyl whose carbon skeleton may be interrupted by one or more —O—, —S—, —$NR^7$— or —CO— moieties and/or which may be substituted by one or more of hydroxyl, halogen, aryl, $C_1$-$C_4$-alkoxy and acetyl; hydroabietyl, abietyl or aryl; $R^1$ and $R^2$ or $R^1$, $R^2$ and $R^3$ may combine to form a 5- to 7-membered cyclic radical which contains the nitrogen atom and may contain further hetero atoms;
$R^5$ is a radical of the formula IIb'

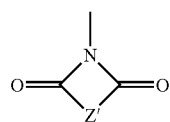

$R^6$ is one of the $R^1$ alkyl radicals;
$R^7$ is hydrogen or $C_1$-$C_4$-alkyl;
Me is an alkali metal ion;
Z and Z' are each independently arylene which may be substituted by one or more of halogen, —$SO_3H$, —$SO_3^-Me^+$, —$SO_3^-N^+R^1R^2R^3R^4$, and $C_1$-$C_{12}$-alkyl, and the rings $B^1$ and $B^2$ may each be independently additionally substituted by one or more identical or different R radicals other than hydrogen with the proviso that when A is =CH—, at least one of the two rings is substituted by at least one R radical other than hydrogen.

The crystallization modifiers of the formula I which are to be used according to the present invention may preferably be prepared in situ in the course of the synthesis of quinophthalone pigments or from inexpensive starting materials. Although their molecular structure may at most only resemble part of that of the pigments, they none the less exert an advantageous influence on the crystallization of quinophthalone pigments in particular, and this was unforeseeable.

Any alkyl and alkenyl appearing in the formulae I and II may be straight-chain or branched.

Illustrative examples of alkyl are: methyl, ethyl, propyl, isopropyl, butyl, isobutyl, sec-butyl, tert-butyl, pentyl, isopentyl, neopentyl, tert-pentyl, hexyl, 2-methylpentyl, heptyl, 1-ethylpentyl, octyl, 2-ethylhexyl, isooctyl, nonyl, isononyl, decyl, isodecyl, undecyl, dodecyl, tridecyl, isotridecyl, tetradecyl, pentadecyl, hexadecyl, heptadecyl, octadecyl, nonadecyl and eicosyl (the above designations isooctyl, isononyl, isodecyl and isotridecyl are trivial names and are derived from alcohols produced by the oxo process).

Illustrative examples of alkyl radicals whose carbon chain may be interrupted by one or more —O—, —S—, —NR7—, —CO— or —$SO_2$— moieties and of alkoxy- and alkanoyl-substituted alkyl are:
2-methoxyethyl, 2-ethoxyethyl, 2-propoxyethyl, 2-isopropoxyethyl, 2-butoxyethyl, 2- and 3-methoxypropyl, 2- and 3-ethoxypropyl, 2- and 3-propoxypropyl, 2- and 3-butoxypropyl, 2- and 4-methoxybutyl, 2- and 4-ethoxybutyl, 2- and 4-propoxybutyl, 3,6-dioxaheptyl, 3,6-dioxaoctyl, 4,8-dioxanonyl, 3,7-dioxaoctyl, 3,7-dioxanonyl, 4,7-dioxaoctyl, 4,7-dioxanonyl, 2- and 4-butoxybutyl, 4,8-dioxadecyl, 3,6,9-trioxadecyl, 3,6,9-trioxaundecyl, 3,6,9-trioxadodecyl, 3,6,9,12-tetraoxatridecyl and 3,6,9,12-tetraoxatetradecyl;
2-methylthioethyl, 2-ethylthioethyl, 2-propylthioethyl, 2-isopropylthioethyl, 2-butylthioethyl, 2- and 3-methylthiopropyl, 2- and 3-ethylthiopropyl, 2- and 3-propylthiopropyl, 2- and 3-butylthiopropyl, 2- and 4-methylthiobutyl, 2- and 4-ethylthiobutyl, 2- and 4-propylthiobutyl, 3,6-dithiaheptyl, 3,6-dithiaoctyl, 4,8-dithianonyl, 3,7-dithiaoctyl, 3,7-dithianonyl, 4,7-dithiaoctyl, 4,7-dithianonyl, 2- and 4-butylthiobutyl, 4,8-dithiadecyl, 3,6,9-trithiadecyl, 3,6,9-trithiaundecyl, 3,6,9-trithiadodecyl, 3,6,9,12-tetrathiatridecyl and 3,6,9,12-tetrathiatetradecyl;
2-monomethyl- and 2-monoethylaminoethyl, 2-dimethylaminoethyl, 2- and 3-dimethylaminopropyl, 3-monoisopropylaminopropyl, 2- and 4-monopropylaminobutyl, 2- and 4-dimethylaminobutyl, 6-methyl-3,6-diazaheptyl, 3,6-dimethyl-3,6-diazaheptyl, 3,6-diazaoctyl, 3,6-dimethyl-3,6-diazaoctyl, 9-methyl-3,6,9-triazadecyl, 3,6,9-trimethyl-3,6,9-triazaundecyl, 12-methyl-3,6,9,12-tetraazatridecyl and 3,6,9,12-tetramethyl-3,6,9,12-tetraazatridecyl;
propan-2-on-1-yl, butan-3-on-1-yl, butan-3-on-2-yl and 2-ethylpentan-3-on-1-yl;
2-methylsulfonylethyl, 2-ethylsulfonylethyl, 2-propylsulfonylethyl, 2-isopropylsulfonylethyl, 2-butylsulfonylethyl, 2- and 3-methylsulfonylpropyl, 2- and 3-ethylsulfonylpropyl, 2- and 3-propylsulfonylpropyl, 2- and 3-butylsulfonylpropyl, 2- and 4-methylsulfonylbutyl, 2- and 4-ethylsulfonylbutyl, 2- and 4-propylsulfonylbutyl and 4-butylsulfonyl-butyl.

Illustrative examples of $C_2$-$C_{22}$-alkenyl are oleyl, linoleyl and linolenyl.

Examples of alkoxy are methoxy, ethoxy, propoxy, isopropoxy, butoxy, isobutoxy, sec-butoxy and tert-butoxy.

Examples of cycloalkyl are cyclopropyl, cyclobutyl, cyclopentyl, cyclohexyl, cycloheptyl and cyclooctyl. Examples of cycloalkyl containing heteroatoms are dioxanyl, morpholinyl, tetrahydrofuryl, pyrrolidinyl and piperidinyl.

Examples of aryl are phenyl and 1- and 2-naphthyl.

Halogen is in particular chlorine or bromine, of which chlorine is preferred.

Substituted alkyl preferably comprises a chain of up to 12, especially 6 and in particular 4 carbon atoms and carries preferably one or two substituents. Examples are: 2-hydroxyethyl, 2- and 3-hydroxypropyl, 1-hydroxyprop-2-yl and 2- and 4-hydroxybutyl and benzyl.

Examples of 5- to 7-membered cyclic radicals formed from $R^1$ and $R^2$ or $R^1$ to $R^3$ that contain the nitrogen atom and may be benzofused are: morpholinyl, pyrrolidinyl, piperidyl, pyrryl, pyridyl, pyrimidyl, pyrazolyl, imidazolyl, thiazolyl, triazyl, quinaldyl, quinolinyl, benzoxazolyl, benzothiazolyl, benzothiadiazolyl, benzimidyzolyl and isoquinolyl.

Examples of arylene and substituted arylene Z to Z' are 1,2-phenylene, tetrachloro- and tetrabromo-1,2-phenylene, 1,2-naphthylene, 2,3-naphthylene and 1,8-naphthylene, of which 1,2-phenylene and tetrachloro-1,2-phenylene are preferred.

Useful alkoxycarbonyl includes for example methoxycarbonyl, ethoxycarbonyl, propoxycarbonyl, butoxycarbonyl, pentoxycarbonyl and hexoxycarbonyl.

Examples of acyl are methylcarbonyl, ethylcarbonyl, propylcarbonyl, butylcarbonyl and pentylcarbonyl.

Examples of arylsulfonyl are in particular phenylsulfonyl and substituted phenylsulfonyl such as p-tolylsulfonyl, p-chlorophenylsulfonyl and p-bromophenylsulfonyl.

The synthesis of the compounds of the formula I will now be illustrated for compounds Ia by way of example. Other compounds I and also the naphthalene derivatives Ib including especially the preferred naphthalene derivatives of the formula Ib where $R^{b1}$ is a D radical can be synthesized in a similar manner.

The aminoquinaldine derivatives of the formula Ia where $X^a$ is methyl and $Y^a$ is a radical of the formula IIb may be synthesized from 8-aminoquinaldine.

Aminoquinaldine derivatives Ia without substitution on the quinaldine ring system are obtainable directly by reacting 8-aminoquinaldine with an appropriate phthalic anhydride. Substituted aminoquinaldine derivatives Ia are preparable either by reacting substituted 8-aminoquinaldine with an appropriate phthalic anhydride or by subsequent substitution reaction on the reaction product of unsubstituted 8-aminoquinaldine and phthalic anhydride. Aminoquinaldine derivatives of the formula Ia where R a is —SO$_3$H are preparable by either version, for example by reaction with oleum.

Quinaldine derivatives of the formula Ia where $X^a$ is a radical of the formula IIa and $Y^a$ is hydrogen, chlorine or $C_1$-$C_4$-alkyl may be prepared in similar fashion from quinaldine. In this case, reaction with oleum will yield quinaldine derivatives of the formula Ia where $R^{a2}$ is —SO$_3$H.

These sulfonations are advantageously carried out using an oleum having a sulfur trioxide content in the range from 0.1% to 65% by weight and especially in the range from 5 to 25% by weight.

The amount of oleum is in itself not critical. Since the oleum also serves as a solvent, sufficient oleum should be used for the solution to remain stirrable. The amount of oleum used per g of compound to be sulfonated is typically in the range from 1 to 10 g and preferably about 3-7 g.

The reaction temperature is generally in the range from 0 to 200° C. and preferably in the range from 50 to 130° C.

The reaction time may be in the range from 1 to 20 h. In general, the sulfonation, which is regioselective, will take about 8 h.

The product is typically collected by filtration after the reaction mixture has been hydrolyzed in ice-water.

Sulfonated aminoquinaldine and quinaldine derivatives Ia may be converted into the corresponding ammonium salts Ia (respectively $R^{a1}$ and $R^{a2}$: —SO$_3$$^-$N$^+$R$^1$R$^2$R$^3$R$^4$), which bring about the formation of particularly readily dispersible pigments, by further reaction with amines or quaternary ammonium salts.

Primary, secondary and tertiary amines can be used. Secondary and tertiary amines may each contain identical or different alkyl groups. It is also possible to use, for example, fatty amines having linear, hydrogenated or unsaturated alkyl radicals. Especially relatively short alkyl radicals having up to 6 carbon atoms may be linear or branched and/or carry up to 2 substituents selected from the preferred group consisting of hydroxyl, acetyl, methoxy, ethoxy, chlorine and bromine.

Examples of particularly preferred amines and ammonium salts are stearylamine, methyldistearylamine, dimethylstearylamine and hydroabietylamine and dimethyldistearylammonium salts.

An ammonium salt may be formed in a generally customary manner, in organic solvents, water or an aqueous organic medium. Suitable reaction temperatures generally range from 20 to 100° C. The product may likewise be collected by filtration.

However, the ammonium salt may also be formed in the course of the pigment finishing process of the present invention, which comprises a grinding operation and a recrystallization, by adding approximately equimolar amounts of the aminoquinaldine- or quinaldinesulfonic acid Ia and the amine or ammonium salt in either of the two finishing steps.

The corresponding alkali metal salts (respectively $R^{a1}$ or $R^{a2}$: —SO$_3$$^-$Me$^+$, where Me is preferably sodium or potassium and more preferably sodium) are obtainable by neutralization of the sulfonic acid derivatives with corresponding alkali metal bases.

Aminoquinaldine and quinaldine derivatives of the formula Ia where respectively $R^{a1}$ and $R^{a2}$ are each —SO$_2$NR$^1$R$^2$, may preferably be prepared by sulfochlorination and subsequent amidation.

The sulfochlorination may be carried out similarly to the sulfonation, using chlorosulfonic acid. The product obtained is advantageously further reacted with thionyl chloride to ensure that all sulfonic acid groups have been converted into the acyl chloride.

The amount of chlorosulfonic acid is likewise in itself not critical. However, to obtain stirrable solutions it is customary to use from 1 to 10 g and preferably about 4 g of chlorosulfonic acid per g of compound to be sulfochlorinated.

This reaction is generally carried out at from 80 to 180° C. and preferably at from 100 to 130° C. and takes about 1-20 h and preferably about 2-10 h.

When the product is subsequently further reacted with thionyl chloride, the reaction mixture obtained is advantageously cooled down to about 70-80° C. before thionyl chloride is added, generally in an amount from 0.3 to 1 g and especially from 0.4 to 0.7 g per g of compound to be sulfochlorinated.

After a further reaction time of typically 0.5-2 h, the regioselectively monosulfochlorinated product can be collected by filtration after hydrolysis in ice-water. Typically, it is then forwarded to the amidation without prior drying.

The amidation is carried out using a primary or secondary amine. The amines recited above are preferably used for this reaction.

Preferably, the amidation is carried out in a substantially neutral aqueous medium. To maintain a pH of about 7, it is advisable to perform the reaction in the presence of a buffer, for example sodium dihydrogen phosphate/disodium hydrogen phosphate.

The amidation is typically carried out from 0 to 20° C. and takes about 0.5-5 h and especially from 1 to 3 h.

Aminoquinaldine and quinaldine derivatives of the formula Ia where respectively $R^{a1}$ and $R^{a2}$ are each —CH$_2$NR$^1$R$^2$ or —CH$_2$R$^5$ are obtainable by methylamidation in a Tscherniac-Einhorn reaction.

The preferred phthalimidomethyl derivatives Ia may thus be prepared by reaction with paraformaldehyde and phthalimide in concentrated sulfuric acid or in oleum, which may contain from 0.1% to 10% by weight and preferably 3% by weight of sulfur trioxide.

Typically from 0.05 to 0.2 g and preferably from 0.06 to 0.1 g of paraformaldehyde and from 0.1 to 0.3 g and preferably from 0.2 to 0.25 g of phthalimide are used per g of compound to be aminomethylated.

The amount of sulfuric acid or oleum is in itself not critical. Generally from 1 to 10 g and in particular about 5 g are used per g of compound to be aminomethylated.

In an advantageous way of carrying out this reaction, sulfuric acid or oleum is introduced as an initial charge, phthalimide and paraformaldehyde are added alternately and, after a reaction time of about 0.5-2 h at from 40 to 60° C., the compound to be aminomethylated is added, and the mixture is then allowed to react at from 80 to 120° C. for about 2-5 h.

The product is typically collected by filtration after hydrolysis of the reaction mixture in water.

Aminoquinaldine and quinaldine derivatives of the formula Ia where respectively $R^{a1}$ and $R^{a2}$ are each —$COR^6$ or $C_1$-$C_4$-alkyl are obtainable by customary Friedel-Crafts acylation and Friedel-Crafts alkylation, respectively, of the unsubstituted derivatives of the formula Ia. Aminoquinaldine and quinaldine derivatives of the formula Ia where respectively $R^{a1}$ and $R^{a2}$ are —COOH or —$COOR^6$ are obtainable by Friedel-Crafts acylation of the unsubstituted derivatives of the formula Ia and subsequent reaction with respectively water and alcohols.

The compounds I to be used according to the present invention are very useful as crystallization modifiers for organic pigments. They make it possible for the crude pigment to be converted into a useful, finely divided pigmentary state having a narrow particle size distribution.

They are particularly useful as crystallization modifiers for quinophthalone pigments, preferably for quinophthalone pigments of the general formula III

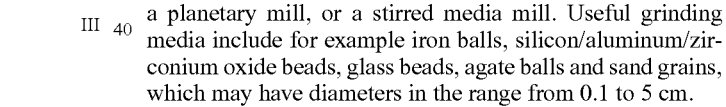

where
$R^8$ is hydrogen, halogen or $C_1$-$C_4$-alkyl;
one of $R^9$, $R^{10}$ and $R^{11}$ is a radical of the formula IIb'

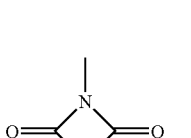

the others each being hydrogen;
Z and Z' are each independently arylene which may be substituted by one or more of halogen, —$SO_3H$, —$SO_3$—$Me^+$, —$SO_3^-N^+R^1R^2R^3R^4$ and $C_1$-$C_{12}$-alkyl, more preferably for quinophthalone pigments of the formula III where $R^8$, $R^9$ and $R^{10}$ are each hydrogen and most preferably for C.I. Pigment Yellow 138.

In the inventive process for converting crude organic pigments, especially crude quinophthalone pigments, into a finely divided pigmentary state, the finishing of the crude pigment is carried out in the presence of one or more compounds I.

In a preferred version of the process according to the present invention, the as-synthesized crude pigment is ground, preferably in the absence of grinding assistants, and the millbase obtained is subsequently recrystallized in an organic solvent, or a mixture of organic solvent and water, in the presence of one or more compounds I.

In a second preferred version, one or more compounds I are already present during the grinding and the millbase obtained is subsequently recrystallized in an organic solvent or a mixture of organic solvent and water.

It will be apreciated that the compounds I may also be added in subdivided portions at different stages of the finishing operation.

It is also possible to carry out the grinding directly in the presence of a recrystallizing solvent, for example $C_2$-$C_4$-alkanols, glycols, glycol ethers and dialkyl phthalates, especially diethyl phthalate and particularly dimethyl phthalate. In this case, there is no need for a subsequent recrystallization step.

Also, the synthesis of the crude pigment itself may preferably be carried out in the presence of the compounds I and then finishing the resulting mixture of crude pigment and compound I.

Finally, crude pigment and compound I may also be synthesized concurrently in situ.

Compound or compounds I is or are used in an amount, based on the crude pigment, which is generally in the range from 0.1% to 15% by weight and preferably in the range from 1% to 10% by weight.

The grinding can be carried out in a ball mill, a swing mill, a planetary mill, or a stirred media mill. Useful grinding media include for example iron balls, silicon/aluminum/zirconium oxide beads, glass beads, agate balls and sand grains, which may have diameters in the range from 0.1 to 5 cm.

Grinding is preferably carried on until the millbase has a median primary particle size of <30 nm. Accordingly, grinding typically takes from 5 to 60 h especially from 20 to 50 h.

A multiplicity of organic solvents can be used for the recrystallization.

Useful solvents are alcohols especially having up to 10 carbon atoms, ether alcohols, ethers, ketones, carboxylic acids especially having up to 4 carbon atoms, carboxamides, carboxylic esters and also alicyclic and aromatic hydrocarbons. It will be appreciated that mixtures of these solvents may also be used. Specific examples are:

methanol, ethanol, propanol, isopropanol, butanol, isobutanol, tert-butanol, amyl alcohol, isoamyl alcohol, hexanol, isohexanol, heptanol, octanol, 2-ethylhexanol, ethylene glycol, 1,2- and 1,3-propylene glycol, cyclohexanol, methylcyclohexanol, benzyl alcohol and 2-phenylethanol;

ethylene glycol monomethyl, monoethyl and monobutyl ether and diethylene glycol monomethyl and monoethyl ether;

dipropyl ether, diisopropyl ether, dibutyl ether, diisobutyl ether, tetrahydrofuran, dioxane, diethylene glycol dimethyl and diethyl ether;

acetone, methyl ethyl ketone, methyl propyl ketone, methyl butyl ketone, diethyl ketone, methyl isopropyl ketone, methyl isobutyl ketone, cyclopentanone, cyclohexanone, methylcyclohexanone, acetophenone and propiophenone;

formic acid, acetic acid, propionic acid and butyric acid;

formamide, N,N-dimethyl- and N,N-diethylformamide, N,N-dimethyl- and N,N-diethylacetamide, N,N-dimethyl- and N,N-diethylpropionamide and N-methylpyrrolidone;

dimethyl phthalate and diethyl phthalate;

cyclohexane, benzene, toluene, xylene, mesitylene, ethylbenzene, chlorobenzene, o-dichlorobenzene, trichlorobenzene, naphthalene and methylnaphthalene.

The recrystallization is preferably carried out using solvents which are easy to remove in the workup, for example by washing with water, azeotropic distillation with water, steam distillation or by drying the entire batch (by distilling off the solvent for example).

Particular preference is given to using solvents which have a boiling point ≦150° C. and can be evaporated without decomposition and without leaving a residue, for example $C_1$-$C_5$-alkanols, ketones such as methyl ethyl ketone, ethers such as tetrahydrofuran and dioxane and hydrocarbons such as cyclohexane, benzene, toluene, xylene and chlorobenzene and mixtures thereof, of which xylene and toluene are most preferred.

The amount of solvent is generally not critical and can be varied within wide limits. The amount of solvent used per g of millbase is generally in the range from 3 to 6 g, preferably in the range from 4 to 5 g.

The recrystallization is typically carried out at from 25 to 160° C., especially from 60 to 140° C.

The recrystallization can be effected by dispersing the millbase in the solvent or else by simply allowing the millbase to dwell in the solvent. The mixture of millbase and solvent is preferably stirred.

The duration of the recrystallization step depends on the temperature and the solvent. Generally recrystallization will be complete in the course of from 1 to 10 h.

The finishing process of the present invention makes it possible to vary the median particle size of the product pigments in a specific manner via the amount of compound I and adjust it to whichever value is desired <150 nm. The BET surface area is similarly controllable in a specific manner in the range from 30 to 120 m²/g.

The dispersal of the finely divided pigments in the application medium can be augmented by adding further customary pigment assistants during the finishing process (in the course of the grinding and/or recrystallization steps). When such assistants are used, their amount will typically be in the range from 0.5 to 30% by weight and especially in the range from 1 to 10% by weight.

The organic pigments obtained in the course of the finishing process of the present invention, and correspondingly the similarly inventive pigment preparations, which comprise (A) at least one organic pigment and (B) at least one compound of the formula I and also, if desired, a component (C), are notable for their fine state of subdivision and their large surface area and hence are useful for diverse applications.

Particular interest pertains to the quinophthalone pigments obtained according to the present invention, which are notable for their excellent color and rheological properties and also fastnesses, especially by virtue of high transparency, high color strength and high gloss, ease of dispersion and impeccable overcoating, solvent and weathering fastness. Application in alkyd/melamine baking finishes typically provides the following color properties: hue: 92-96°; lightness L≧80; chroma C≧80; transparency, measured in scattering delta E, ≦95 to about 40.

They are very useful for coloring a multiplicity of application media, for example plastics, solventborne and waterborne coatings and, because of their transparency, in particular also printing inks for all common printing processes, for example offset printing, intaglio printing, packaging printing, tinplate printing, and textile printing. More particularly, because of their fine state of subdivision, they can also be used in ink jet inks, color filters and electrophotographic toners and developers, for example one-, two- and multi-component powder toners (also known as one- or two-component developers), magnetic toners, liquid toners, addition polymerization toners and specialty toners. It will be appreciated that they can also be used combined with further colorants, for example with mono- and disazo and isoindoline pigments such as C.I. Pigment Yellow 12, 13, 14, 17, 139 and 185.

EXAMPLES

A) Preparation of Compounds of Formula I

Example 1 a) 50 g of 8-aminoquinaldine were introduced a little at a time into 250 g of cooled 11% by weight oleum at about 10° C. with stirring. The mixture was then heated to 90° C. and stirred at 90° C. for 3 h.

After cooling to 25° C., the reaction mixture was introduced into 1400 ml of water. The thus precipitated product was filtered off, washed to pH 4 with completely ion-free water and dried at 40° C. in a vacuum drying cabinet.

This furnished 59.4 g of 8-aminoquinaldine-5-sulfonic acid, which corresponds to a yield of 79%.

b) A mixture of 100 g of phenol, 34 g of the 8-aminoquinaldine-5-sulfonic acid obtained in step a) and 49 g of tetrachlorophthalic anhydride was heated to 180° C. and stirred at 180° C. for 8 h. The water of reaction formed was removed using a Dean-Stark apparatus. The reaction mixture was cooled to 90° C., 300 ml of methanol were added dropwise and the product was filtered off at 60° C., washed with methanol to clear runoff and dried at 40° C. in a vacuum drying cabinet.

This furnished 52.9 g of the aminoquinaldine derivative Ia', which corresponds to a yield of 73%.

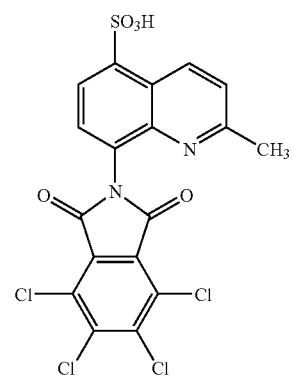

Ia'

Analytical Data:

$^1$H NMR (DMSO): δ=9.27 (d, 1H), 8.1 (d, 1H), 7.85 (d, 1H), 7.65 (d, 1H), 2.61 (s, 3H) ppm;

mass (TOF MS ES+): m/z=507 [M-H+, 100%].

Example 2

A mixture of 237 g of phenol, 118.5 g of 8-aminoquinaldine and 214.5 g of tetrachlorophthalic anhydride was heated to 140° C. and stirred at 140° C. for 4 h. The water of reaction formed was removed using a Dean-Stark apparatus. The reaction mixture was cooled to 90° C., 300 ml of methanol were added and the product was filtered off at 60° C., washed with methanol to clear runoff and dried at 100° C. in a vacuum drying cabinet.

This furnished 331.8 g of the aminoquinaldine derivative Ia", which corresponds to a yield of 98%.

Ia"

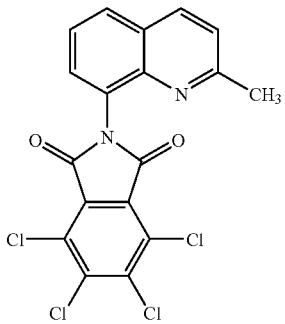

Analytical Data:
$^1$H NMR (DMSO): δ=8.52 (d, 1H), 8.20 (d, 1H), 7.90 (d, 1H), 7.77 (t, 1H), 7.6 (d, 1H), 2.61 (s, 3H) ppm.

Example 3

To a mixture of 265 g of phenol and 286 g of tetrachloroterephthalic anhydride were added 172 g of quinaldine at 150° C. The reaction mixture was stirred at 150° C. for 4 h and then cooled down to 90° C., 300 ml of methanol were added dropwise, and the product was filtered off at 60° C., washed with methanol to clear runoff and dried at 40° C. in a vacuum drying cabinet.

This furnished 346.8 g of the quinaldine derivative Ia''', which corresponds to a yield of 84%.

Ia'''

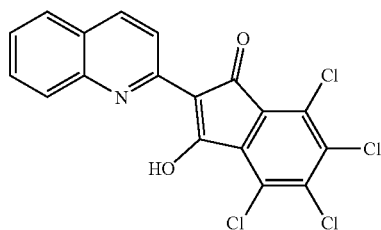

Analytical Data:
$^1$H NMR (D$_2$SO$_4$): δ=8.42 (d, 1H), 8.02 (d, 1H), 7.65 (m, 3H), 7.42 (m, 1H) ppm.

Example 4

A mixture of 100 g of phenol, 50 g of 1-aminonaphthalene-6-sulfonic acid and 67 g of tetrachlorophthalic anhydride was heated to 180° C. and stirred at 180° C. for 8 h. The water of reaction formed was removed using a Dean-Stark apparatus. The reaction mixture was cooled to 90° C., 300 ml of methanol were added dropwise and the product was filtered off at 60° C., washed with methanol to clear runoff and dried at 40° C. in a vacuum drying cabinet.

This furnished 52.9 g of the aminonaphthalene derivative Ib', which corresponds to a yield of 73%.

Ib'

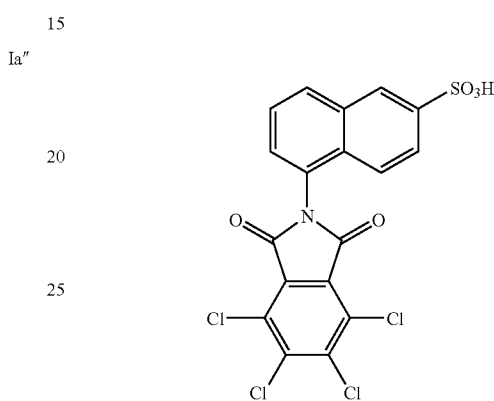

Analytical Data:
IR (KBr): ν=3050 (C—H-aromatic); 1783, 1726 (C=O); 1597, 1505 (C—C-aromatic); 1171, 1030 (S=O) cm$^{-1}$.

B) Preparation and Use of Inventive Pigment Preparations

Examples 5 to 14

Variant A 100 g of C.I. Pigment Yellow 138 in the form of the crude pigment obtained as per Example 1 of DE-A-17 70 960 were milled with about 1900 g of iron balls 2 cm in diameter in a 1 liter capacity swing mill on a swing stand for 40 h.

A mixture of 97 g of the millbase, x g of one of the compounds of Examples 1 to 4, y g of the amine A and 300 g of xylene were then stirred at 125° C. for 5 h. The solvent was subsequently distilled off at 125° C. under reduced pressure, and the product was dried down to a xylene content <0.1%.

Variant B

Milling was carried out similarly to variant A, except that 97 g of the crude pigment were milled in the presence of x g of one of the compounds of Examples 1 to 4.

The millbase obtained was recrystallized similarly to variant A in xylene in the presence of y g of amine A.

Variant C

C.I. Pigment Yellow 138 was synthesized in the presence of one of the compounds of Examples 1 to 4.

This was done by heating a mixture of 265 g of phenol, 450 g of tetrachloroterephthalic anhydride and x g of one of the compounds of Examples 1 to 4 to 180° C. 112 g of molten 8-aminoquinaldine were added dropwise at 180° C. The reaction mixture was subsequently stirred at 180° C. for 8 h, and the water of reaction formed was removed using a Dean-Stark apparatus. The reaction mixture was cooled to 90° C., 300 ml of methanol were added dropwise and the product was filtered off at 60° C., washed with methanol to clear runoff and dried at 40° C. in a vacuum drying cabinet.

The crude pigment obtained was then milled and recrystallized in xylene by addition of y g of amine A, both steps being carried out similarly to variant A.

Variant D

C.I. Pigment Yellow 138 was synthesized in the presence of a precursor V of the compounds of Examples 1 to 4. The precursor V used was 8-aminoquinaldine-5-sulfonic acid in Example 11, 8-aminoquinaldine in Example 12, quinaldine in Example 13 and 1-aminonaphthalene-6-sulfonic acid in Example 14.

A mixture of 265 g of phenol, u g of tetrachloroterephthalic anhydride (TPSA) and x g of precursor V was heated to 180° C. w g of molten 8-aminoquinaldine (AC) were added dropwise at 180° C. The reaction mixture was subsequently stirred at 180° C. for 8 h, and the water of reaction formed was removed using a Dean-Stark apparatus. The reaction mixture was cooled to 90° C., 300 ml of methanol were added dropwise and the product was filtered off at 60° C., washed with methanol to clear runoff and dried at 40° C. in a vacuum drying cabinet.

The crude pigment obtained was then milled and recrystallized in xylene by addition of y g of amine A, both steps being carried out similarly to variant A.

With all variants, the finished pigment was subsequently pulverized and tested.

In all cases, the finished C.I. Pigment Yellow 138 obtained was observed to have a median ($d_{50}$) particle size <150 nm under the electron microscope. BET surface area was in the range from 30 to 120 m$^2$/g.

The pigment obtained in each case was very easy to disperse in all application media. Incorporation into an alkyd/melamine baking varnish gave a transparent and brilliant yellow hue having a very greenish tinge.

The color properties were determined by preparing color pastes by shaking 1.0 g of each pigment and 9.0 g of an alkyd-melamine baking varnish (35% by weight in xylene) with 10 ml of glass beads 3 mm in diameter in a 30 ml glass bottle on a Skandex dispersing assembly for 60 min. 1.6 g of each color paste were then mixed with 1.0 g of a white paste pigmented to 40% by weight with titanium dioxide (Kronos 2310; white reduction about ⅓ standard depth of shade), applied as a 150 μm film to a metal panel, flashed off and baked at 130° C. for 30 min. The CIELAB coordinates H (hue angle), C (chroma) and L (lightness) were subsequently determined using a Spectraflash SF 600 Plus spectrophotometer from Datacolor.

Color strength is reported in terms of coloring equivalents (CEs) and was likewise determined in white reduction. The coloration with the pigment finished in the absence of compounds I was assigned the CE value of 100 (standard). CE values <100 indicate a higher color strength than standard, CE values >100 correspondingly a lower color strength.

Transparency was determined by drawing down the above-described color paste on a piece of black and white cardboard in a film thickness of 200 μm and, after drying, determining the scattering delta E over black against the comparative sample with the pigment finished in the absence of compounds I. Negative values signify a higher transparency.

Details concerning these tests and the results of the measurements are shown in Tables 1 and 2.

The following designations were used:

Amine A1: ditallow fatty dimethylammonium chloride (Arquad® HC, Akzo Chemicals)

Amine A2: ditallow fatty methylamine (Armeen® M2HT, Akzo Chemicals)

Amine A3: hydroabietylamine (Amine D, Hercules)

TABLE 1

| Ex. | Variant | xg | Cpd. I | yg | Amine A | H | C | L | CE | Transparency |
|---|---|---|---|---|---|---|---|---|---|---|
| 5 | A | 5.1 | Ia' | 3.1 | A3 | 94.9 | 88.3 | 90.2 | 82 | −20.3 |
| 6 | B | 5.1 | Ia' | 3.1 | A1 | 94.9 | 88.2 | 89.7 | 80 | −23.5 |
| 7 | C | 5.9 | Ia' | 3.1 | A2 | 94.6 | 88.2 | 89.8 | 85 | −19.7 |
| 8 | B | 2.3 | Ia'' | — | — | 93.7 | 88.0 | 89.5 | 90 | −18.2 |
| 9 | A | 7.3 | Ia''' | — | — | 93.9 | 88.1 | 89.7 | 90 | −10.6 |
| 10 | A | 7.3 | Ib' | 3.1 | A3 | 94.0 | 87.9 | 89.6 | 83 | −20.1 |
| Comp. | A | — | — | — | — | 93.0 | 87.7 | 89.2 | 100 | — |

TABLE 2

| Ex. | Variant | xg | Precursor V | ug of TPSA | wg of AC | H | C | L | CE | Transparency |
|---|---|---|---|---|---|---|---|---|---|---|
| 11 | D | 14.3 | Ia' | 422 | 112 | 95.2 | 88.4 | 90.3 | 73 | −24.8 |
| 12 | D | 15.8 | Ia'' | 450 | 117 | 93.8 | 88.1 | 89.5 | 87 | −15.8 |
| 13 | D | 17.5 | Ia''' | 440 | 112− | 94.5 | 88.2 | 89.8 | 83 | −18.1 |
| 14 | D | 18.1 | Ib' | 428 | 112 | 93.7 | 88.0 | 89.4 | 86 | −17.9 |
| Comp. | A | — | — | — | — | 93.0 | 87.7 | 89.2 | 100 | — |

We claim:

1. A method of crystallizing organic pigments, comprising crystallizing an organic pigment in the presence of a compound represented by formula I:

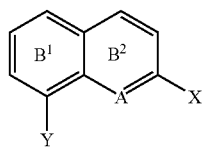

wherein

A is =N—;

X is methyl or a radical of the formula IIa:

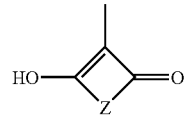

Y is an R radical or a radical of the formula IIb:

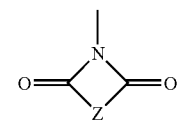

with either X being a radical of the formula IIa or Y being a radical of the formula IIb;

R is hydrogen, halogen, $C_1$-$C_4$-alkyl, —$SO_3H$, —$SO_3^-$ $Me^+$, —$SO_3^-N^+R^1R^2R^3R^4$, —$SO_2NR^1R^2$, —$CH_2NR^1R^2$, —$CH_2R^5$, —COOH, —$COO^-N^+$ $R^1R^2R^3R^4$, —$COOR^6$ or —$COR^6$;

$R^1$, $R^2$, $R^3$ and $R^4$ are each independently hydrogen; $C_1$-$C_{22}$-alkyl or $C_2$-$C_{22}$-alkenyl whose carbon chain may in either case be interrupted by one or more —O—, —S—, —$NR^7$—, —CO— or —$SO_2$— moieties and/or which may be substituted by one or more of hydroxyl, halogen, aryl, $C_1$-$C_4$-alkoxy and acetyl; $C_3$-$C_8$-cycloalkyl whose carbon skeleton may be interrupted by one or more —O—, —S—, —$NR^7$— or —CO— moieties and/or which may be substituted by one or more of hydroxyl, halogen, aryl, $C_1$-$C_4$-alkoxy and acetyl; hydroabietyl, abietyl or aryl; $R^1$ and $R^2$ or $R^1$, $R^2$ and $R^3$ may combine to form a 5- to 7-membered cyclic radical which contains the nitrogen atom and may contain further hetero atoms;

$R^5$ is a radical of the formula IIb':

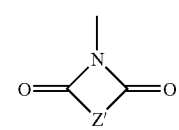

$R^6$ is one of the $R^1$ alkyl radicals;
$R^7$ is hydrogen or $C_1$-$C_4$-alkyl;
Me is an alkali metal ion;

Z and Z' are each independently arylene which may be substituted by one or more of halogen, —$SO_3H$, —$SO_3^-$ $Me^+$, —$SO_3^-N^+R^1R^2R^3R^4$, and $C_1$-$C_{12}$-alkyl, and the rings $B^1$ and $B^2$ may each be independently additionally substituted by one or more identical or different R radicals other than hydrogen.

2. The method of claim 1, wherein the compound represented by formula I is represented by formula Ia:

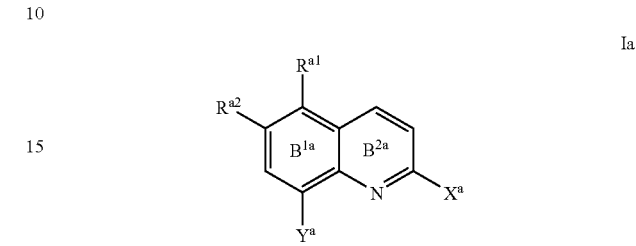

wherein $X^a$ is methyl or a radical of formula IIa:

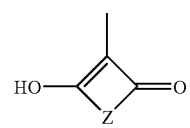

$Y^a$ is hydrogen, halogen, $C_1$-$C_4$-alkyl or a radical of the formula IIb

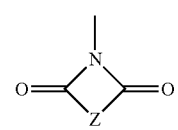

with either $X^a$ being a radical of the formula IIa or $Y^a$ being a radical of the formula IIb;

$R^{a1}$, $R^{a2}$ are each hydrogen, halogen, $C_1$-$C_4$-alkyl or a D radical, although $R^{a1}$ can be a D radical only when $X^a$ is methyl and $R^{a2}$ can be a D radical only when $X^a$ is a radical of the formula IIa;

D is —$SO_3H$, —$SO_3^-Me^+$, —$SO_3^-N^+R^1R^2R^3R^4$, —$SO_2NR^1R^2$ or —$CH_2NR^1R^2$;

$R^1$, $R^2$, $R^3$ and $R^4$ are each independently hydrogen; $C_1$-$C_{22}$-alkyl or $C_2$-$C_{22}$-alkenyl whose carbon chain may in each case be interrupted by one or more —O— or —$NR^7$— moieties; hydroabietyl, abietyl or aryl;

Me is an alkali metal ion;

Z is arylene which may be substituted by one or more of halogen, —$SO_3H$, —$SO_3^-Me^+$, —$SO_3^-N^+R^1R^2R^3R^4$ and $C_1$-$C_{12}$-alkyl, and the rings $B^{1a}$ and $B^{2a}$ may each be independently additionally substituted by halogen or $C_1$-$C_4$-alkyl at different positions than $R^{a1}$ and $R^{a2}$.

3. The method of claim 1, wherein X is a radical of the formula IIa and Y is an R radical.

4. The method of claim 1, wherein X is methyl and Y is a radical of the formula IIb.

5. The method of claim 3, wherein Z is tetrachlorophenylene.

6. The method of claim 4, wherein Z is tetrachlorophenylene.

7. The method of claim 3, wherein $B^1$ and $B^2$ are unsubstituted.

8. The method of claim 4, wherein $B^1$ and $B^2$ are unsubstituted.

9. The method of claim 3, wherein $B^1$ and $B^2$ are substituted once by —$SO_3H$.

10. The method of claim 4, wherein $B^1$ and $B^2$ are substituted once by —$SO_3H$.

11. The method of claim 1, wherein the organic pigment is a quinophthalone pigment.

12. The method of claim 1, wherein the crystallizing is conducted in an organic solvent.

13. The method of claim 1, wherein the crystallizing is conducted in a mixture of an organic solvent and water.

14. The method of claim 12, wherein the organic solvent is an alcohol, ether alcohol, ether, ketone, carboxylic acid, carboxamide, carboxylic ester, alicyclic hydrocarbon or aromatic hydrocarbon.

15. The method of claim 13, wherein the organic solvent is an alcohol, ether alcohol, ether, ketone, carboxylic acid, carboxamide, carboxylic ester, alicyclic hydrocarbon or aromatic hydrocarbon.

16. The method of claim 1, wherein the amount of the compound represented by formula I is from 0.1 to 15% by weight based on the amount of the organic pigment.

17. The method of claim 1, wherein the amount of the compound represented by formula I is from 1 to 10% by weight based on the amount of the organic pigment.

18. The method of claim 1, wherein the crystallizing is conducted at from 25 to 160° C.

19. The method of claim 1, wherein the crystallizing is conducted at from 60 to 140° C.

20. The method of claim 1, wherein the mean particle size of the crystallized organic pigment is <150 nm.

21. The method of claim 1, wherein the crystallized pigment has a BET surface area of 30 to 120 $m^2/g$.

22. A method of coloring a media, comprising:
(a) crystallizing an organic pigment according to the method of claim 1, followed by
(b) combining the organic pigment with a media.

23. A compound represented by the formula I':

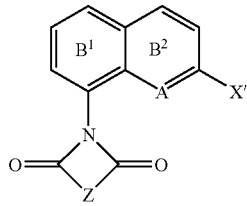

wherein
A is =N—,
X' is methyl;
The rings $B^1$ and $B^2$ may be independently additionally substituted by one or more identical or different R radicals, wherein $B^2$ is not substituted at the 4-position;
R is halogen, $C_1$-$C_4$-alkyl, —$SO_3H$, —$SO_3^-Me^+$, —$SO_3^-N^+R^1R^2R^3R^4$, —$SO_2NR^1R^2$, —$CH_2NR^1R^2$, —$CH_2R^5$, —COOH, —$COO^-N^+R^1R^2R^3R^4$, —$COOR^6$ or —$COR^6$;
$R^1$, $R^2$, $R^3$ and $R^4$ are each independently hydrogen; $C_1$-$C_{22}$-alkyl or $C_2$-$C_{22}$-alkenyl whose carbon chain may in either case be interrupted by one or more —O—, —S—, —$NR^7$—, —CO— or —$SO_2$— moieties and/or which may be substituted by one or more of hydroxyl, halogen, aryl, $C_1$-$C_4$-alkoxy and acetyl; $C_3$-$C_8$-cycloalkyl whose carbon skeleton may be interrupted by one or more —O—, —S—, —$NR^7$— or —CO— moieties and/or which may be substituted by one or more of hydroxyl, halogen, aryl, $C_1$-$C_4$-alkoxy and acetyl; hydroabietyl, abietyl or aryl; $R^1$ and $R^2$ or $R^1$, $R^2$ and $R^3$ may combine to form a 5- to 7-membered cyclic radical which contains the nitrogen atom and may contain further hetero atoms;
$R^5$ is a radical of the formula IIb':

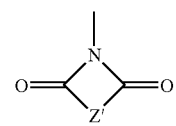

$R^6$ is one of the $R^1$ alkyl radicals;
$R^7$ is hydrogen or $C_1$-$C_4$-alkyl;
Me is an alkali metal ion;
Z and Z' are each independently phenylene which is substituted by one or more of halogen, —$SO_3H$, —$SO_3^-Me^+$, —$SO_3^-N^+R^1R^2R^3R^4$, and $C_1$-$C_{12}$-alkyl.

* * * * *